May 19, 1925.
F. W. CHICH
WAGON UNLOADING DEVICE
Filed March 16, 1923
1,538,464
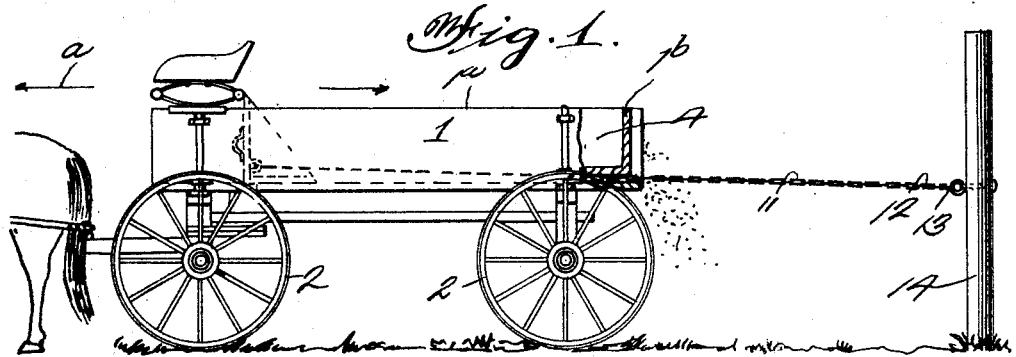
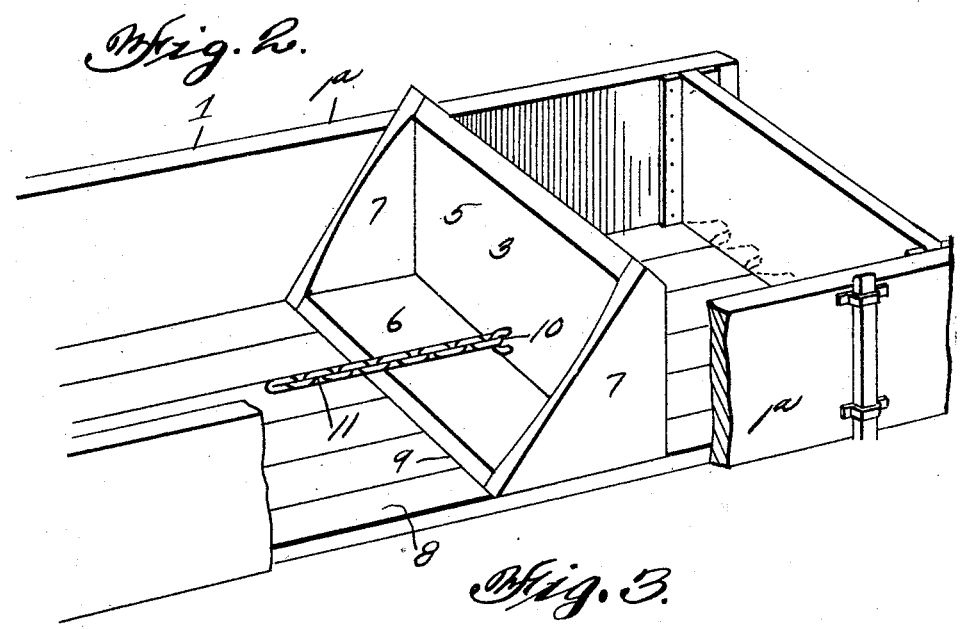
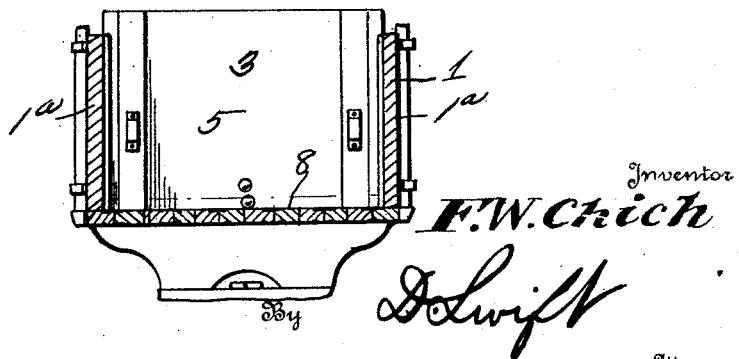
Inventor
F. W. Chich
By D. Swift
Attorney Patented May 19, 1925.

1,538,464

UNITED STATES PATENT OFFICE.

FRED W. CHICH, OF WEYAUWEGA, WISCONSIN.

WAGON-UNLOADING DEVICE.

Application filed March 16, 1923. Serial No. 625,642.

*To all whom it may concern:*

Be it known that I, FRED W. CHICH, a citizen of the United States, residing at Weyauwega, in the county of Waupaca, State of Wisconsin, have invented a new and useful Wagon-Unloading Device; and I do hereby declare the following to be a full, clear, and exact description of the invention, such as will enable others skilled in the art to which it appertains to make and use the same.

The invention relates to unloading devices for wagons, and has for its object to dispose within a wagon body adjacent the forward end thereof a transversely disposed and longitudinally movable member, which when moved rearwardly will force material within the wagon body out of the rear end thereof. Also to provide a chain attached to the transversely disposed member, which chain extends outwardly through the rear end of the body and is adapted to be attached to a post or the like in such a manner that upon the forward movement of the wagon the transversely disposed member will be moved rearwardly and force the material rearwardly out of the wagon body.

A further object is to provide the transversely disposed member with a scraping element adapted to scrape over the bottom of the wagon body compartment, thereby insuring the expelling of all material from the wagon body.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of a wagon showing the unloading device applied thereto.

Figure 2 is a perspective view of the forward portion of the wagon body showing the load expelling device therein.

Figure 3 is a transverse sectional view through the forward end of the wagon body showing the rear side of the load expeller.

Referring to the drawing, the numeral 1 designates the body of a wagon and 2 the supporting wheels therefor. It has been found that in wagons of the non-dump type, that it is necessary to either remove slats in the bottom thereof or to shovel the material from the body, when it is desired to unload. To obviate this difficulty a transversely disposed member 3 is disposed within the body 1, which member is adapted to be moved towards the rear end 4 of the body for forcing the load out of the rear end of the body. The member 3 comprises a vertically disposed portion 5, a horizontally disposed portion 6 and end triangular shaped members 7. The portion 6 rests on the bottom 8 of the wagon and is provided with a sharpened edge 9 for thoroughly scraping the material from the bottom of the body. The triangular shaped members 7 engage the inner walls of the sides 1$^a$ of the body and thoroughly scrape the same, as the transversely disposed member is moved rearwardly. Connected at 10 to the vertically disposed member 5 is a rearwardly extending chain 11, which chain extends through the rear end 4 of the body 1 under the rearwardly movable angularly shaped tail gate 1$^b$, and is adapted to have its end 12 secured to an eye 13 of a post 14. It will be seen that when the wagon as a whole moves forwardly in the direction of the arrow $a$, the member 3 will drag material within the wagon body rearwardly in such a manner that it will be discharged from the rear end 4 of the body, thereby quickly unloading the wagon. The tail gate 1$^b$ is either removed before unloading or by the rearward movement of the material being unloaded. By providing the horizontally disposed portion 6, it will be seen that the weight of the material thereon will prevent the same from tilting and insure the scraping of the bottom 8 by the sharpened edge 9.

From the above it will be seen that a wagon unloading device is provided, which is simple in construction and one which may be easily and quickly applied to the wagon body without modifying the construction of the wagon body. It will also be seen that the unloading operation is a quick one and consequently a great deal of time and labor is saved.

The invention having been set forth what is claimed as new and useful is:—

The combination with a wagon body having slidably mounted therein an unloading device for forcing material from the body through the rear end of the body, a flexible member connected to said slidable member and extending rearwardly through the open end of the body adjacent the bottom thereof, of a rearwardly movable and slidable end gate, said end gate comprising a vertically disposed portion, the lower end of said vertically disposed portion being provided with a horizontally disposed portion extending forwardly in the wagon body and resting on the flexible member, said end gate being held normally in position and against rearward movement by weight of the material on the horizontal portion thereof.

In testimony whereof I have signed my name to this specification in the presence of two subscribing witnesses.

FRED W. CHICH.

Witnesses:
T. F. WILSON,
LOUIS J. STEIN.